No. 760,495. PATENTED MAY 24, 1904.
J. SOUTHERN, DEC'D.
J. J. CONNELL, ADMINISTRATOR.
FURNACE FOR MELTING METALS.
APPLICATION FILED MAY 28, 1901.
NO MODEL. 6 SHEETS—SHEET 1.

WITNESSES: INVENTOR
Henry Krug James Southern,
Russell M. Everett BY
Draket Co.
ATTORNEYS.

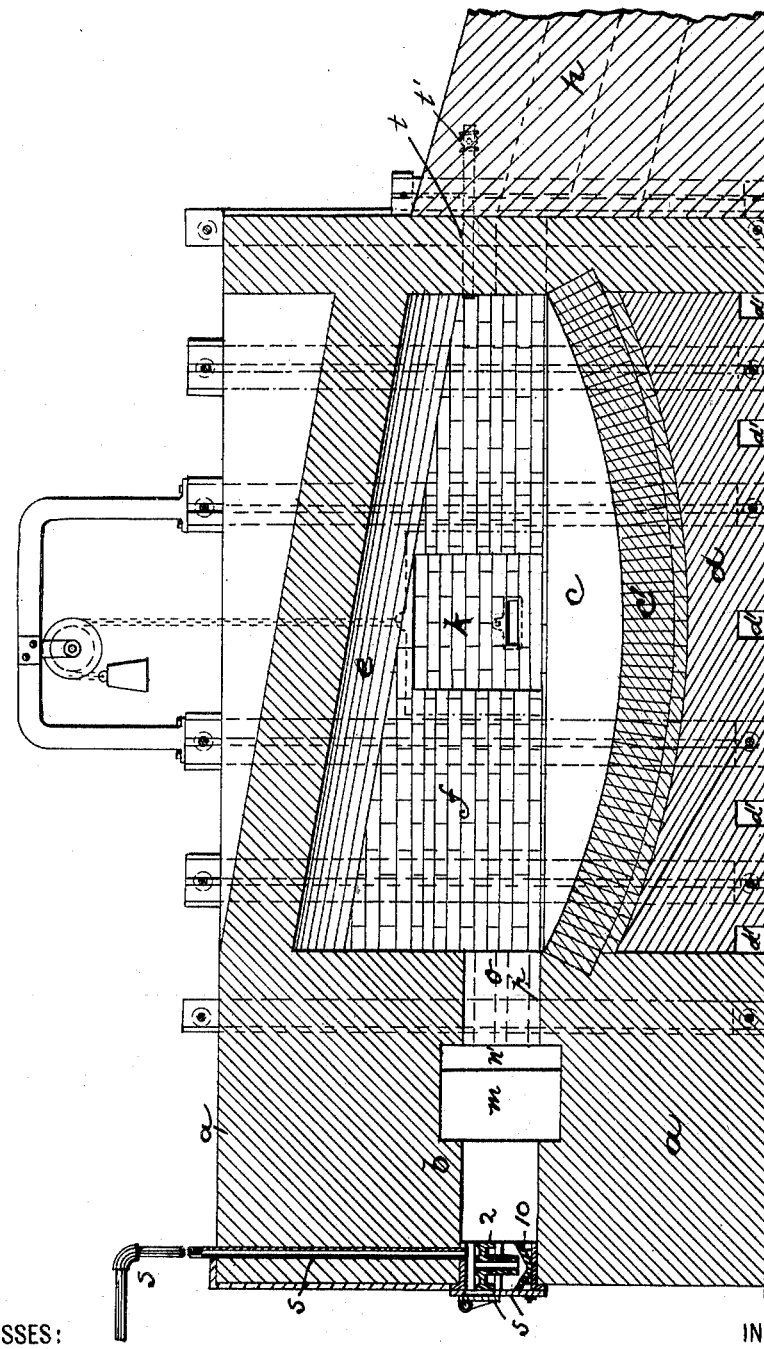

No. 760,495. PATENTED MAY 24, 1904.
J. SOUTHERN, DEC'D.
J. J. CONNELL, ADMINISTRATOR.
FURNACE FOR MELTING METALS.
APPLICATION FILED MAY 28, 1901.
NO MODEL. 6 SHEETS—SHEET 3.
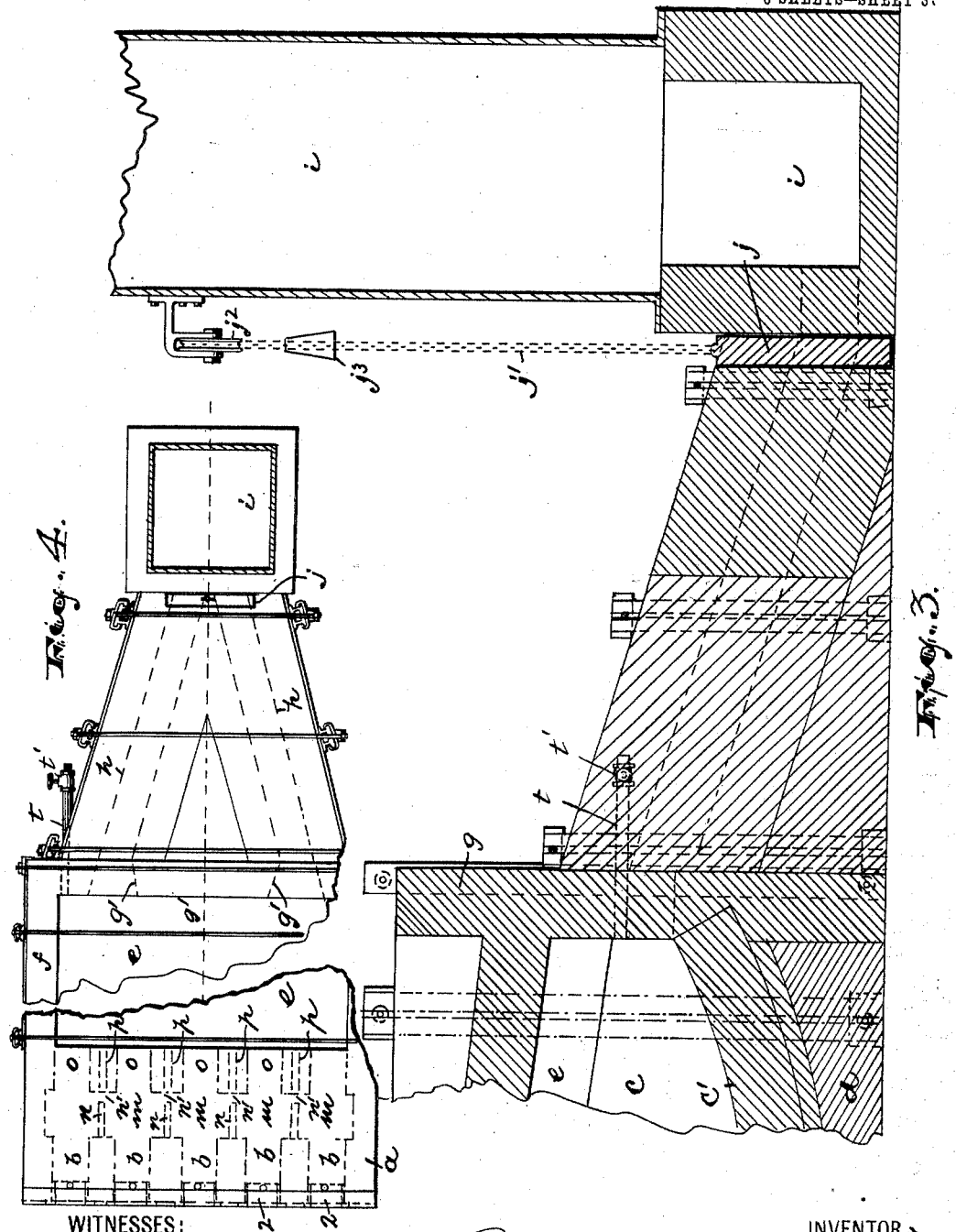
WITNESSES: INVENTOR:
BY
ATTORNEYS.

No. 760,495. PATENTED MAY 24, 1904.
J. SOUTHERN, DEC'D.
J. J. CONNELL, ADMINISTRATOR.
FURNACE FOR MELTING METALS.
APPLICATION FILED MAY 28, 1901.
NO MODEL. 6 SHEETS—SHEET 4.

WITNESSES: INVENTOR
Henry Krug James Southern,
Russell M. Everett BY
Drakett Co
ATTORNEYS.

No. 760,495. PATENTED MAY 24, 1904.
J. SOUTHERN, DEC'D.
J. J. CONNELL, ADMINISTRATOR.
FURNACE FOR MELTING METALS.
APPLICATION FILED MAY 28, 1901.
NO MODEL. 6 SHEETS—SHEET 5.

WITNESSES: Henry Krug. Russell M. Everett.

INVENTOR: James Southern,
BY Drake & Co.
ATTORNEYS

No. 760,495. PATENTED MAY 24, 1904.
J. SOUTHERN, DEC'D.
J. J. CONNELL, ADMINISTRATOR.
FURNACE FOR MELTING METALS.
APPLICATION FILED MAY 28, 1901.
NO MODEL. 6 SHEETS—SHEET 6.

WITNESSES:
Henry Krug.
Russell M. Everett.

INVENTOR
James Southern,
BY
Drake & G.
ATTORNEYS.

THE NORRIS PETERS CO., PHOTO-LITHO., WASHINGTON, D. C.

No. 760,495. Patented May 24, 1904.

UNITED STATES PATENT OFFICE.

JAMES SOUTHERN, OF BELLEVILLE, NEW JERSEY; JOHN J. CONNELL, ADMINISTRATOR OF SAID JAMES SOUTHERN, DECEASED, ASSIGNOR OF ONE-HALF TO WALTER H. STEINBRECHER, OF NEW YORK, N. Y.

FURNACE FOR MELTING METALS.

SPECIFICATION forming part of Letters Patent No. 760,495, dated May 24, 1904.

Application filed May 28, 1901. Serial No. 62,184. (No model.)

*To all whom it may concern:*

Be it known that I, JAMES SOUTHERN, a citizen of the United States, residing at Belleville, in the county of Essex and State of New Jersey, have invented certain new and useful Improvements in Furnaces for Melting Metal; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to furnaces for melting metals; and the objects of the invention are to secure economy of heat and fuel, to enable the metal to be melted in less time, to secure a simple construction and one by which the heat will be under perfect control, and to secure other advantages and results, some of which may be referred to hereinafter in connection with the description of the working parts.

The invention consists in the improved melting-furnace and in the arrangements and combinations of parts of the same, all substantially as will be hereinafter set forth, and finally embraced in the clauses of the claim.

Figure 1:
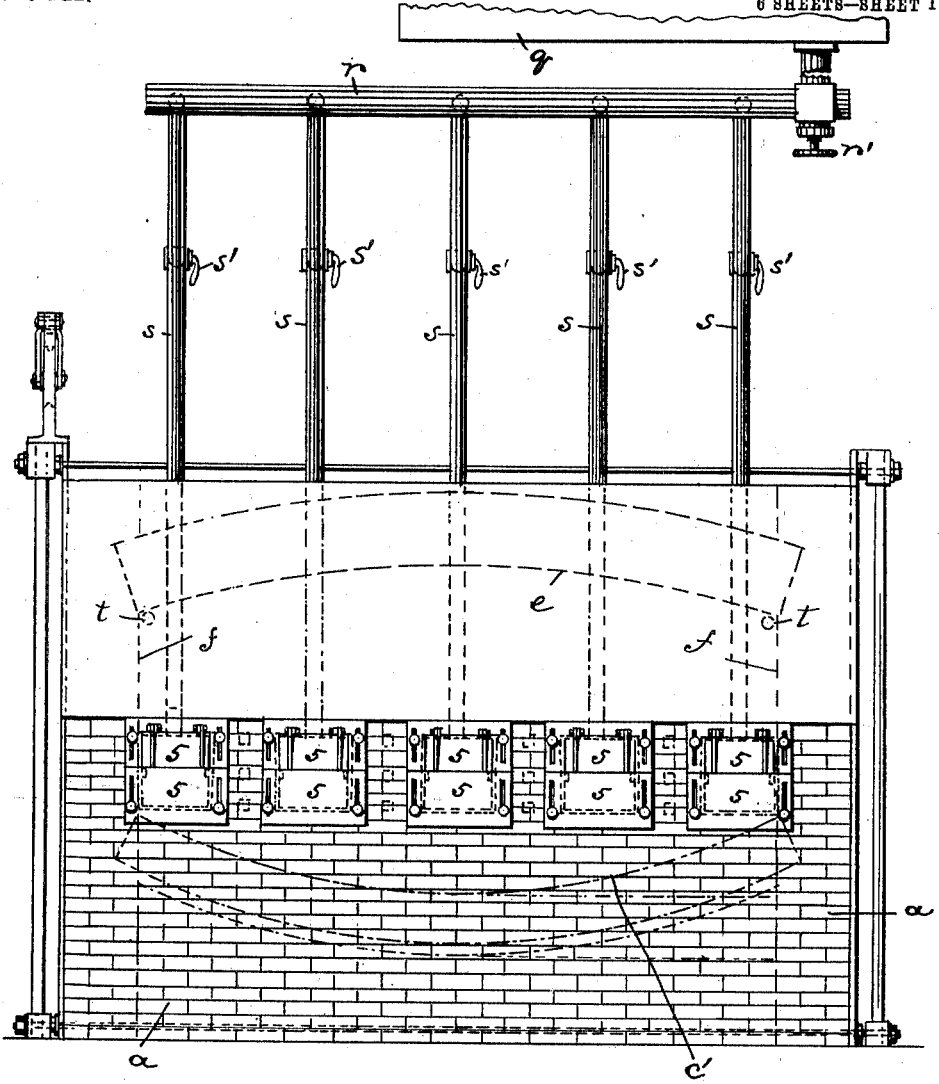
Figure 5:
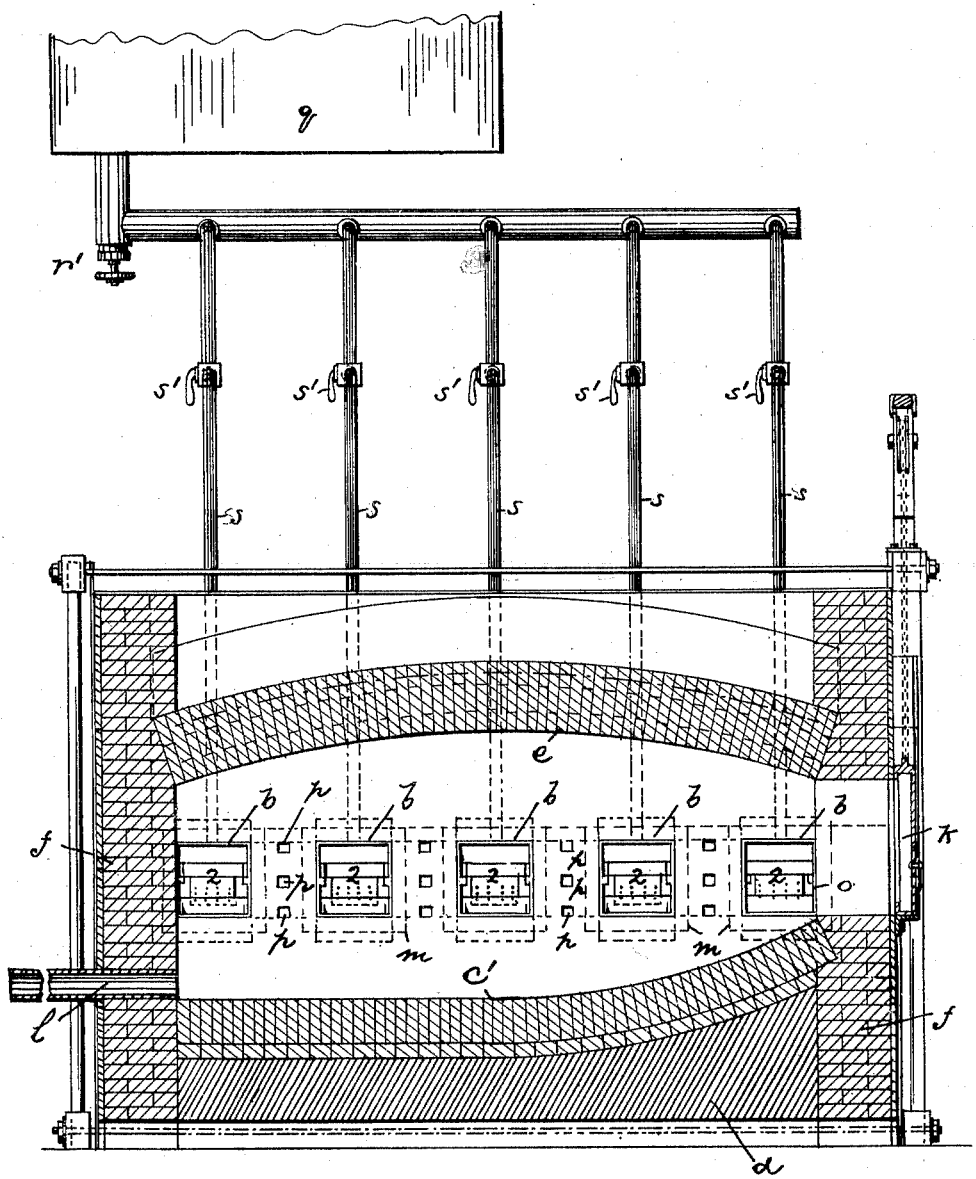
Figure 6:
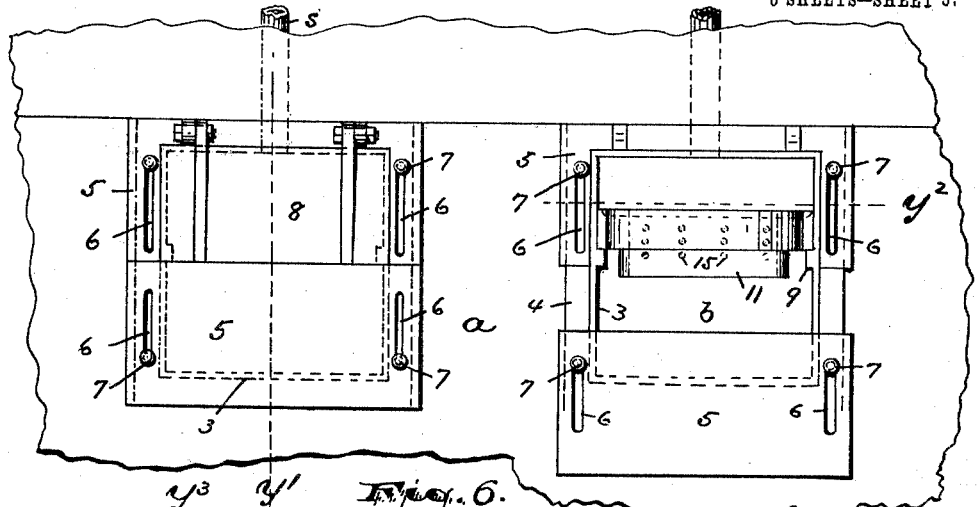
Figure 8:
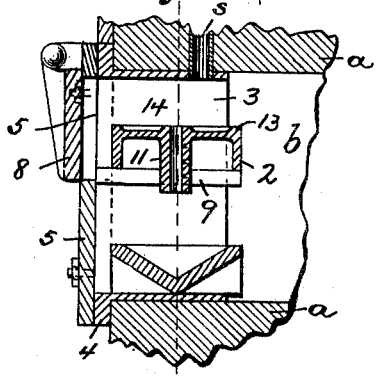
Figure 7:
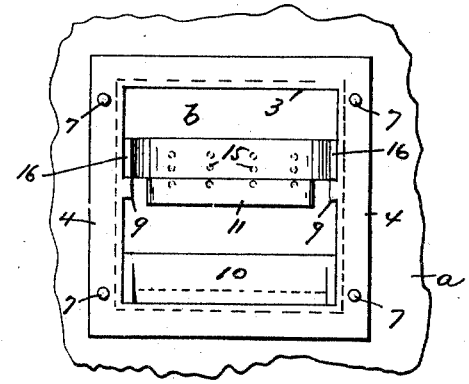
Figure 9:
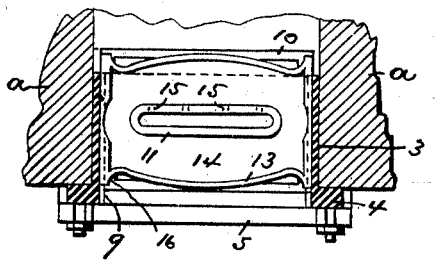
Figure 10:
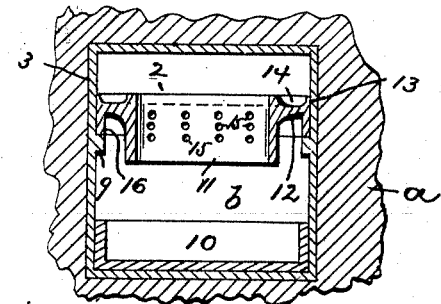
Figure 11:
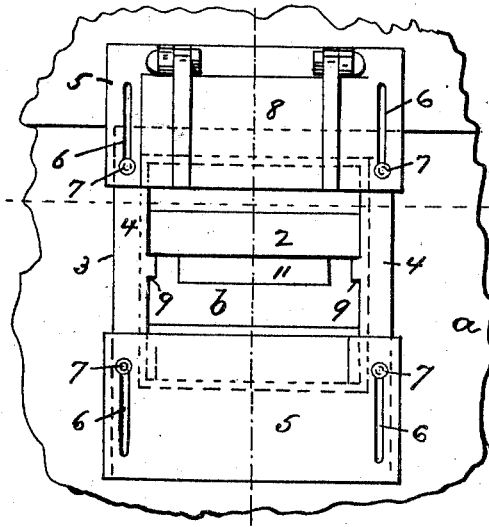
Figure 12:
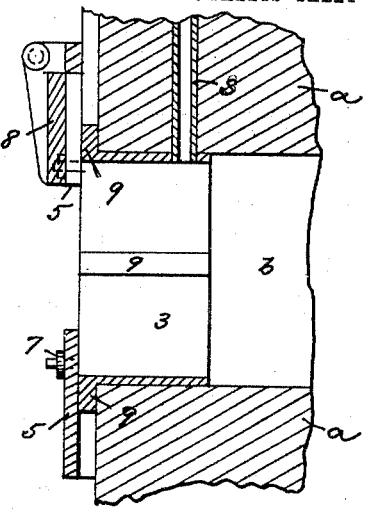
Figure 13:
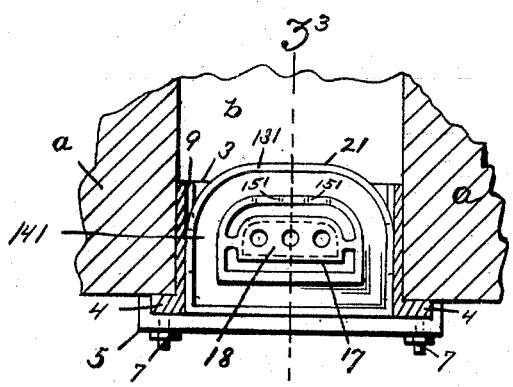
Figure 14:
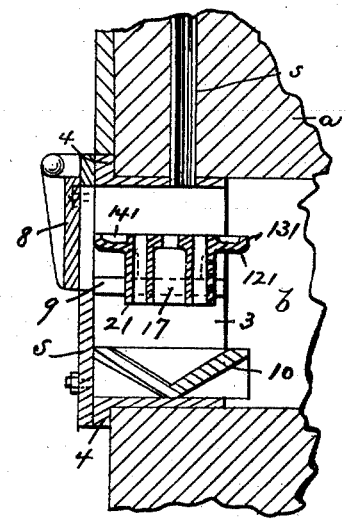

Referring to the accompanying drawings, in which like letters of reference indicate corresponding parts in each of the several figures, Figure 1 is a front elevation of a melting-furnace of my improved construction. Fig. 2 is a central vertical longitudinal section of the body part of the furnace, and Fig. 3 is a continuation of the same through the draft-flue and stack. Fig. 4 is a plan of the furnace and stack. Fig. 5 is a vertical cross-section looking toward the front of the furnace. Fig. 6 is an enlarged front elevation of two of the burner-passages at the front end of the furnace, the doors of one being closed and the other having its lower door slid open and the hinged section of the upper door removed. Fig. 7 shows the doors removed and a burner seated in the passage. Fig. 8 is a vertical central section taken longitudinally through a burner-passage and burner, as on line $y'$, Fig. 6. Fig. 9 is a horizontal section through a burner-passage above the burner, as on line $y^2$, Fig. 6; and Fig. 10 is a vertical transverse section of a burner-passage and burner, as on line $y^3$, Fig. 8. Fig. 11 is a front elevation of a burner-passage and burner therein, the doors being slid apart to their widest extent. Fig. 12 is a vertical longitudinal section of the same, as on line $z'$, Fig. 11, but with the burner removed. Fig. 13 is a horizontal section of the burner-passage, as on line $z^2$, Fig. 11, showing in plan a burner of modified construction; and Fig. 14 is a vertical longitudinal section, as on line $z^3$, Fig. 13, of a burner-passage with the doors closed and a burner therein of the modified construction shown in Fig. 13.

In said drawings, $a$ indicates the heavy thick front wall of the furnace, built of brick and provided with apertures or combustion-chambers $b$, extending from front to rear and which will be hereinafter more fully described. Back from said front wall $a$ is the melting-chamber $c$ of the furnace, and into which the combustion-chambers $b$ open. Said melting-chamber has a bottom $c'$, of brick or other suitable material and preferably built up beneath with earth or the like, as at $d$, through which the transverse perforations $d'$ are made to permit cooling and prevent undue expansion from heat. Above the melting-chamber $c$ is a roof or crown $e$, arched from side to side and sloping backwardly downward from the front. Side walls $ff$ of the furnace, extending rearwardly from the front wall $a$, are on either side of the melting-chamber, and at the back of the chamber is a rear wall $g$, through which are openings $g'$ to draft-flues $h$, leading downwardly from the melting-chamber and converging at the foot of a stack or chimney $i$ of any suitable construction. Said converging draft-flues $h$, it will be understood, are ten feet, more or less, in length, and by reason of their downward pitch the hot escaping gases are arrested therein until slightly cooled and a saving of heat effected. Furthermore, a damper $j$ is arranged in a vertical slideway at the foot of the stack to cut transversely across the draft-flues $h$. Said damper can be adjusted to any desirable position by means of a chain $j'$, extending from the damper over a fixed pulley $j^2$, and having a counterbalance-weight $j^3$ on its other end, or by any other suitable means. When the furnace is first started, this damper is left wide open to secure a strong draft; but after a high degree of heat is obtained the partial closing of the damper prevents large quantities of heated gases being carried by an inordinate draft into the stack, where their heat will be dissipated and lost. Both the downwardly-inclined flues $h$ and the damper $j$ also prevent the escape and loss in large quantities of metal from the melting-chamber in gaseous form. At each of the upper outer corners of the rear wall $g$ of the melting-chamber $c$ I prefer to insert the vent-pipes $t$, leading through said rear wall to the outer atmosphere, as shown in Figs. 1, 3, and 4. These serve to permit the escape of carbonic acid or other gases which are apt to become entrapped in the top of the chamber on starting the furnace to the hindrance of getting up heat. Means for temporarily closing these vent-pipes may be provided, if desired, such as valves $t'$.

One side wall $f$ of the melting-chamber has a door $k$ to provide access to said chamber for inserting a charge of scrap metal, skimming the molten metal or the like, and at the opposite side of the chamber is a tap-hole $l$ in the side wall for drawing off the molten metal. The said tap-hole is at a lower height than the door $k$, and the bottom $c'$ of the melting-chamber $c$ slopes from the door $k$ to said tap-hole $l$, so as to facilitate outflow. The bottom is also concaved from the front to rear, as shown in Fig. 2 more particularly.

The combustion-chambers $b$ consist of perforations or openings through the front wall $a$ about fourteen inches square. There may be any number of these combustion-chambers, according to the size of the furnace. In the drawings, where I have shown a ten-ton furnace, five combustion-chambers are shown, and preferably a large enough number is always provided so that one or two could be shut off and the furnace still kept in heat by the others.

At their front or outer ends the combustion-chambers form passage-ways in which burners 2 are set, the fuel being supplied to said burners from above and an air-supply being taken in at the mouth of said passage-ways from the atmospheric air in front of the furnace.

Midway of its length each combustion-chamber is enlarged, as at $m$, the enlarged portions of two contiguous chambers being separated by only a comparatively thin partition $n$, and this partition is at its end next the inner end of the combustion-chamber cut away, as at $n'$, so as to provide lateral communication between the enlarged portions $m$ of the combustion-chambers. Beyond the enlargements $m$ the combustion-chambers are constricted, as at $o$, to their original size to open into the melting-chamber. The brickwork of the wall $a$ between said inner constricted ends $o$ of the combustion-chambers is preferably perforated by small auxiliary openings $p$ in the plane of the partition $n$, between the combustion-chambers and leading from the communicating enlarged portions of the chambers into the melting-chamber.

In operation of the furnace the flames reach back from the burners $g$ at the mouths of the combustion-chambers $b$ into the enlarged portions $m$ of said chamber, and the products of combustion and unconsumed gases issue from the main openings $o$ and auxiliary openings $p$ into the melting-chamber $c$ with considerable force under the powerful draft. There the progress of the gases is retarded, and a more complete combustion occurs, resulting in an intensely-hot temperature, by which the metal is melted before the gaseous products pass into the draft-flues.

My improved furnace is adapted to be used with different fuels—such as oil, gas, coal, &c.—a different burner being used according to the fuel employed. In the drawings I have shown the furnace as equipped with burners adapted to consume oil as a fuel, said oil being fed from an elevated tank $q$ by gravity through a main duct $r$ and smaller ducts $s$ to the several burners. The main duct is preferably controlled by a valve $r'$, and each branch duct $s$ also has its individual stop-cock $s'$. The said branch ducts preferably extend downward through the front wall $a$ of the furnace into the top of that portion of the combustion-chambers adapted to contain the burners.

Into the forward end of each combustion-chamber is inserted a metal box or casing 3, having a flange 4 overlapping upon the front of the wall $a$, in which the combustion-chamber $b$ is formed. This box or casing 3 extends far enough inward to form a passage for the burner 2, and the oil-supply pipe $s$ opens downward through the top of said box, as shown in Fig. 7.

The box or casing 3 is provided at the outer flanged end with doors 5, normally covering one the lower half of passage-way and the other the upper half and the two doors being adapted to slide in a vertical plane toward or away from each other to regulate the admission of air to the burner 2. Preferably this sliding is accomplished by slots 6 near the side edges of each door, which receive pins 7 on the flange 4 of the box or casing, nuts at the ends of said pins enabling the doors to be clamped when desired. The upper door 5 has preferably a hinged portion 8 to permit more ready access to the burner for manipulating the same.

Interiorly the box or casing 3 has on its opposite upright sides ribs 9, on which the burner proper (marked 2) sits. Beneath the burner proper is a trough or drip-pan 10 to retain any surplus of oil from the burner until said surplus oil can be consumed, said drip-pan standing on the floor of the casing 3.

The burner proper comprises a casting having an elliptical or oblong tubular main part 11, adapted to normally occupy a vertical position. Near the upper end of said main tubular part 11 is an exterior peripheral flange 12, raised at its outer edge, as at 13, to form, with the walls, of the main part 11, an annular trough or groove 14, into which the oil is received from the supply-pipe $s$ and from which it is burned. Any surplus of oil over what the trough 14 will contain is adapted to flow over the walls of said trough and down the tubular portion 11. The wall of said tubular portion has perforations 15 at the side next the furnace, so that the down-flowing oil burns out through said perforations. Any unconsumed oil reaching the lower end of the burner falls into the drip-pan 10, before described.

The flange 13 of the burner is provided at its under surface, at the sides of the burner, with parallel runners 16, adapted to rest on the ribs 9 of the box or casing and support the burner.

In Figs. 13 and 14 I have shown a burner 21, having in its central passage an integral air-duct 17, centrally disposed and adapted to conduct air upward through its perforated top 18 to the center of the burner, while permitting the downflow of oil around itself.

Having thus described the invention, what I claim as new is—

1. A melting-furnace having a wall $a$, a melting-chamber beyond said wall, a plurality of combustion-chambers formed in said wall and branching at their ends next the melting-chamber to provide an increased number of discharge-openings to discharge heat into the melting-chamber, and means for supplying heat.

2. In a melting-furnace, a wall $a$, and a melting-chamber beyond said wall, the wall having transverse combustion-chambers in the outer ends of which combustion may take place, the middle portion of said chambers being enlarged and the inner ends next the melting-chamber branching into an increased number of discharge-openings.

3. In a melting-furnace having a melting-chamber $c$, the combination of combustion-chambers $b$, leading through the front wall of said melting-chamber and comprising passages adapted at their outer ends to receive burners, said passages being enlarged at their middle portions and thereat communicating with each other and with auxiliary passages opening into the melting-chamber, and said auxiliary passages.

In testimony that I claim the foregoing I have hereunto set my hand this 2d day of May, 1901.

JAMES SOUTHERN.

Witnesses:
C. B. PITNEY,
RUSSELL M. EVERETT.